(12) United States Patent
Hu et al.

(10) Patent No.: US 11,656,613 B2
(45) Date of Patent: May 23, 2023

(54) INFORMATION PROCESSING DEVICE AND INFORMATION PROCESSING METHOD

(71) Applicant: HITACHI, LTD., Tokyo (JP)

(72) Inventors: Shizhen Hu, Tokyo (JP); Yusuke Nishi, Tokyo (JP); Daisuke Komaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 4 days.

(21) Appl. No.: 17/026,438

(22) Filed: Sep. 21, 2020

(65) Prior Publication Data

US 2021/0165397 A1 Jun. 3, 2021

(30) Foreign Application Priority Data

Nov. 29, 2019 (JP) .............................. JP2019-216844

(51) Int. Cl.
*G05B 19/418* (2006.01)
*B23P 21/00* (2006.01)

(52) U.S. Cl.
CPC ... *G05B 19/41875* (2013.01); *G05B 19/4183* (2013.01); *G05B 19/41865* (2013.01)

(58) Field of Classification Search
CPC .......... G05B 19/41875; G05B 19/4183; G05B 19/41865; G05B 19/4099; G05B 19/41815; G05B 19/4189; G05B 2219/45005; G05B 2219/45055; G05B 2219/49007; B33Y 10/00; B33Y 30/00; B33Y 40/00; B23P 21/004; B29K 2105/06; Y02P 90/02
See application file for complete search history.

(56) References Cited

U.S. PATENT DOCUMENTS

| 2002/0032492 A1* | 3/2002 | Sohner ................... G06Q 10/06 700/95 |
| 2003/0171972 A1* | 9/2003 | Heskin ............... G06Q 10/0631 705/7.12 |
| 2007/0179652 A1* | 8/2007 | Weigang .......... G05B 19/41865 700/111 |
| 2008/0051929 A1* | 2/2008 | Hongkham ....... H01L 21/67276 700/214 |

(Continued)

FOREIGN PATENT DOCUMENTS

| JP | 10244442 A | 9/1998 |
| JP | 2005-190409 A | 7/2005 |
| JP | 2019-185588 A | 10/2019 |

OTHER PUBLICATIONS

Japanese Office Action dated Mar. 22, 2023 for Japanese Patent Application No. 2019-216844.

*Primary Examiner* — Chris Parry
*Assistant Examiner* — Hassan A Khan
(74) *Attorney, Agent, or Firm* — Volpe Koenig

(57) ABSTRACT

A grouping unit, with the use of facility order priority information and facility order rule information, determines a group to which facility orders belong, stores the group in grouping information, performs grouping of facility orders, which do not include a sequential relation in a reverse direction among facility orders, into the same group, performs grouping of facility orders, which include a sequential relation in a reverse direction among facility orders, into a different group, integrates the facility orders grouped in the same group, and sets the integrate facility order as a display facility order of the group.

11 Claims, 17 Drawing Sheets

(56) References Cited

U.S. PATENT DOCUMENTS

| | | | | |
|---|---|---|---|---|
| 2014/0277618 A1* | 9/2014 | Nixon | ................... | G05B 13/02 |
| | | | | 700/83 |
| 2017/0199518 A1* | 7/2017 | Stoeckel | .......... | G05B 19/41885 |
| 2018/0339456 A1* | 11/2018 | Czinger | ................ | B29C 70/205 |
| 2019/0377334 A1* | 12/2019 | Nakamura | ............. | G06Q 10/06 |
| 2020/0110388 A1* | 4/2020 | Takeno | .............. | G05B 19/4183 |

* cited by examiner

| Result# | Serial | Equipment | Start_time | End_time |
|---|---|---|---|---|
| 001 | A01 | A | 2019-06-18 08:00:00 | 2019-06-18 08:02:10 |
| 002 | A01 | B | 2019-06-18 08:02:30 | 2019-06-18 08:05:00 |
| 003 | A01 | D | 2019-06-18 08:05:30 | 2019-06-18 08:08:20 |
| 004 | A02 | A | 2019-06-18 08:05:30 | 2019-06-18 08:07:50 |
| 005 | A02 | B | 2019-06-18 08:08:20 | 2019-06-18 08:11:10 |
| 006 | A02 | D | 2019-06-18 08:12:10 | 2019-06-18 08:15:30 |
| 007 | A03 | A | 2019-06-18 08:29:10 | 2019-06-18 08:31:00 |
| 008 | A03 | D | 2019-06-18 08:31:20 | 2019-06-18 08:33:40 |
| 009 | A03 | C | 2019-06-18 08:34:00 | 2019-06-18 08:35:50 |
| 010 | B01 | A | 2019-06-18 08:20:00 | 2019-06-18 08:22:20 |
| 011 | B01 | C | 2019-06-18 08:23:00 | 2019-06-18 08:25:30 |
| 012 | B01 | D | 2019-06-18 08:25:50 | 2019-06-18 08:27:40 |
| 013 | B02 | B | 2019-06-18 08:45:00 | 2019-06-18 08:47:10 |
| 014 | B02 | C | 2019-06-18 08:48:00 | 2019-06-18 08:51:00 |
| 015 | B02 | D | 2019-06-18 08:51:20 | 2019-06-18 08:53:00 |
| 016 | A04 | A | 2019-06-18 08:51:10 | 2019-06-18 08:53:30 |
| 017 | A04 | D | 2019-06-18 08:54:00 | 2019-06-18 08:57:10 |
| ... | ... | ... | ... | ... |

FIG. 15

| Group# | Facility order | Display facility order | Serial | ... |
|---|---|---|---|---|
| 001 | A→B→D, A→D→C··· | A→B→D→C | A01, A02, A03, Z01, ... | |
| 002 | A→C→D, B→C→D··· | B→A→C→D | B01, B02··· | |
| ... | ... | ... | | ... |

INFORMATION PROCESSING DEVICE AND INFORMATION PROCESSING METHOD

BACKGROUND

The present invention relates to an information processing device and an information processing method.

In recent years, converting a factory into a smart factory attracts attention. In the smart factory, factory data, such as temperature data, facility operation data, and product quality inspection data, are acquired from various sensors and facilities in the factory and visualized and analyzed to improve the producibility and quality in the factory.

In general, in a factory, a product undergoes various processing steps, such as cutting and assembly, until the product is completed. These processing steps are performed at special facilities for each processing, therefore, data collection is implemented, with the data including a start time point of a step as a time point of input to a facility and an end time point of a step as a time point of discharge from the facility.

One method for visualizing factory data is a method in which processing start time points and processing end time points of products are plotted in a chart using, as the vertical axis, orders of facilities (or orders of steps) and using, as the horizontal axis, time points. The inclination of the chart of each product indicates a time necessary for each processing and a waiting time during which processing is not performed, and the chart makes it possible to ascertain, on sight, the production conditions of the product.

In factories, the production under a system of high-mix low-volume production is on the rise. In the high-mix low-volume production, a wide variety of but small amount of products are produced in the same factory in order to meet diversity of customer needs. For example, even producing vehicles of the same model, particular ones among these are produced to partly have a modified feature such as a different body color or a different seat cover from that of other ones. In this case, processing is performed for each of such products by using solely a necessary facility from among many facilities in the factory, hence, in a case where a chart is created according to the order of facilities for the product as described above, the number of the charts becomes massive, making it difficult to monitor the production conditions, that is, to monitor the chart.

Japanese Patent Application Publication No. H10-244442 discloses a technology in which information, such as production target quantity, work period, yield, and facilities to be used, is input and in which products that flow through the same production line are grouped.

SUMMARY

However, the grouping method disclosed in Japanese Patent Application Publication No. H10-244442 does not take into consideration the order of facilities in a displayed chart, hence, information on the chart, such as inclination and shape, is lost, and a chart that enables the production conditions to be grasped on sight cannot be displayed.

The present invention has been made in view of the above-mentioned circumstances, and it is an object thereof to provide an information processing device and an information processing method capable of improving visibility of the order of processing implementations during manufacturing of a product.

In order to achieve the above-mentioned object, an information processing device according to a first aspect extracts, on the basis of an order of processing implementations during manufacturing of a product, a sequential relation of the processing implementations during the manufacturing of the product, and perform grouping of orders of the processing implementations during the manufacturing of the product on the basis of the sequential relation of the processing implementations during the manufacturing of the product.

According to the present invention, the visibility of the order of processing implementations during manufacturing of a product can be improved.

BRIEF DESCRIPTION OF THE DRAWINGS

FIG. 15 is a diagram illustrating an example of grouping results in FIG. 14;

DETAILED DESCRIPTION OF THE EMBODIMENT

Embodiments are described with reference to the drawings. Note that the embodiments described below are not intended to limit the invention as in the claims, and all of various elements described in the embodiments and combinations thereof are not necessarily essential for the solution of the present invention.

Figure 1:
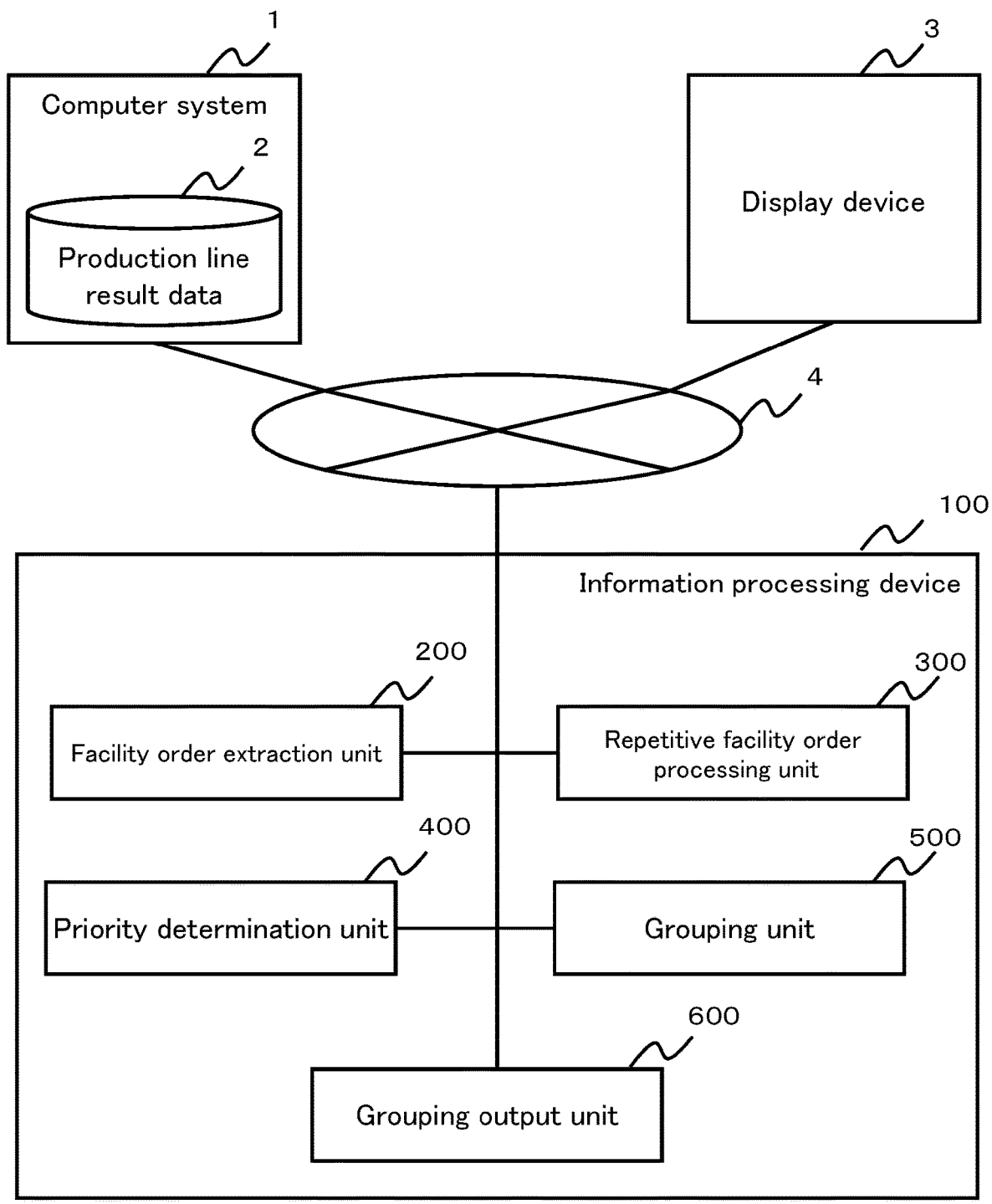
FIG. 1 is a block diagram illustrating a schematic configuration of a system to which an information processing device according to a first embodiment is applied.

FIG. 1 is a block diagram illustrating a schematic configuration of a system to which an information processing device according to a first embodiment is applied. In FIG. 1, an information processing system includes a computer system 1, an information processing device 100, and a display device 3. The information processing device 100 is connected to the computer system 1 and the display device 3 through a network 4 so as to be mutually communicable. Note that the number of the display devices 3 connected to the network 4 is not particularly limited.

The computer system 1 collects production line result data 2 from a data source, such as facility and sensors in a factory, and stores the collected production line result data 2 therein. Examples of production lines include production lines that support high-mix low-volume production. The computer system 1 is, for example, a server computer, which is physical computer hardware. The production line result data 2 includes operation information collected from a production facility and a measurement facility in the site. Examples of the production line result data 2 include a time point at which processing is started in a facility used to manufacture a product, a time point at which processing is completed, a temperature sensor, and a vibration sensor. The production line result data 2 is not limited to the operation information in the facility during the manufacturing of the product, and, for example, may be a measurement value acquired by quality measurement of the product or may be a KPI (Key performance indicator) of the factory defined in advance.

The display device 3 renders charts visualized by using grouping results calculated by the information processing device 100. The display device 3 is, for example, a liquid crystal monitor or an organic EL (Electro Luminescence) display.

The network 4 may be a WAN (Wide Area Network) such as the Internet and may be a LAN (Local Area Network) such as WiFi and Ethernet (registered trademark). A WAN and a LAN may be mixed.

The information processing device 100 extracts a sequential relation of processing for manufacturing products on the basis of the order of the processing implementations for manufacturing the products, performs grouping of the orders of the processing implementations for manufacturing the products on the basis of the sequential relation of the processing implementations for manufacturing the products, and visualizes the orders of the processing implementations for manufacturing the products on the basis of results of the grouping. The order of processing implementations for manufacturing a product may be the order of facilities used for the processing implementations for manufacturing the product, may be the order of steps for manufacturing the product, and may be the order of operations for manufacturing the product.

Examples of the products include vehicles such as an automobile, electric products such as a smartphone, home appliance products such as a refrigerator, semiconductor products such as a memory, food items, and drugs. Examples of the processing include processing, assembly, purification, coating, cleaning, and heat treatment. The processing may include inspection and measurement.

In the following description, the case where a sequential relation of facility is extracted on the basis of the order of facilities used for processing during the manufacturing of products and the orders of the facilities used for the manufacturing of the products are grouped on the basis of the sequential relation of the facility is exemplified.

In this case, the information processing device 100 includes a facility order extraction unit 200, repetitive facility order processing unit 300, a priority determination unit 400, a grouping unit 500, and a grouping output unit 600.

Figure 2:
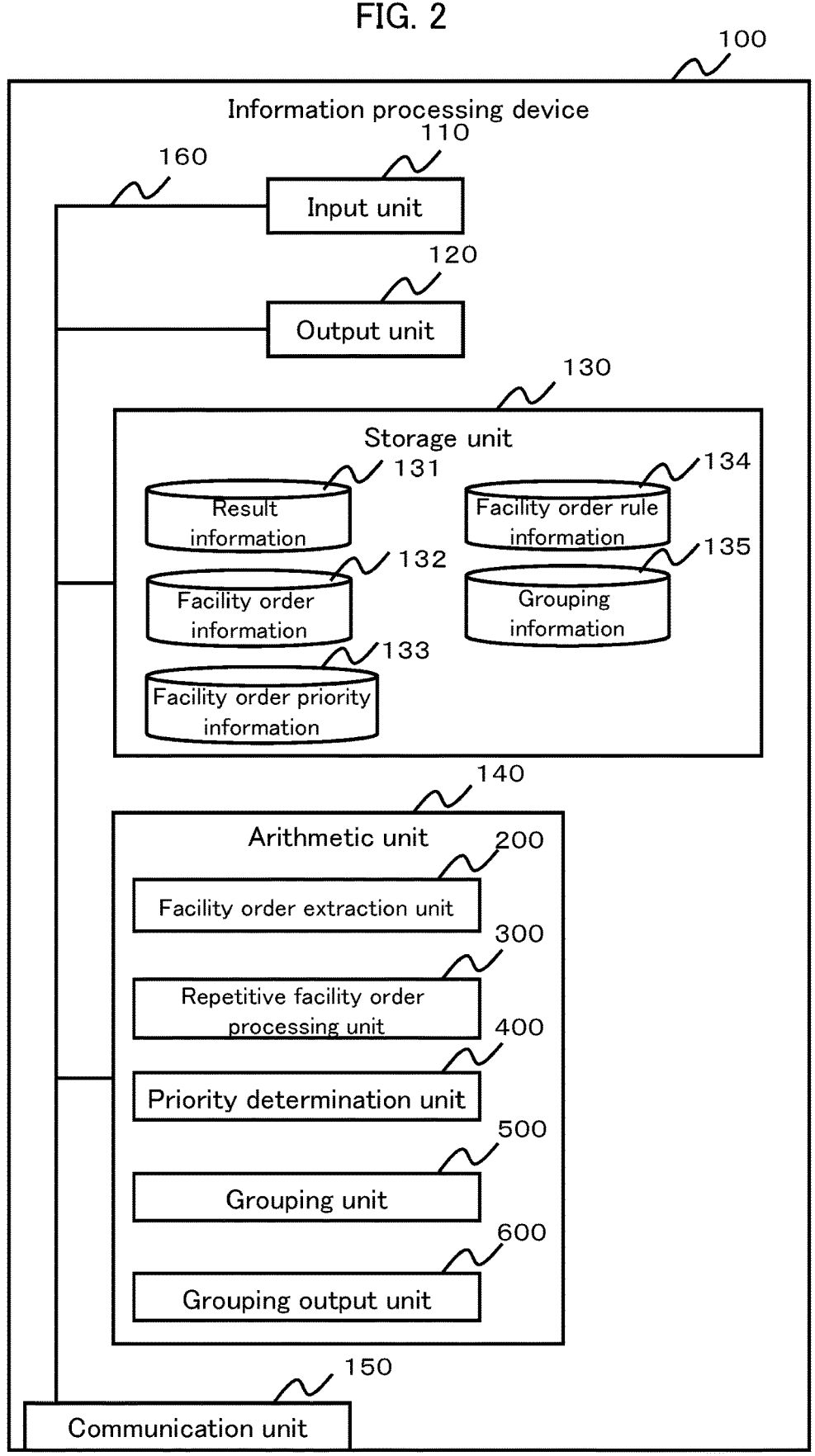
FIG. 2 is a block diagram illustrating a configuration of the information processing device in FIG. 1.

FIG. 2 is a block diagram illustrating a configuration of the information processing device in FIG. 1.

In FIG. 2, the information processing device 100 includes an input unit 110, an output unit 120, a storage unit 130, an arithmetic unit 140, and a communication unit 150. The input unit 110, the output unit 120, the storage unit 130, the arithmetic unit 140, and the communication unit 150 are connected to one another through an internal bus 160.

The input unit 110 receives input information. For example, the input unit 110 receives input information on a user input through input devices such as a keyboard and a mouse included in the information processing device 100. The input unit 110 stores the received input information in the storage unit 130, or outputs the received information to the arithmetic unit 140.

The output unit 120 generates screen information to be displayed on the display device 3 in FIG. 1. For example, the output unit 120 generates screen information to be displayed on the display device 3, and outputs the generated screen information to the display device 3.

The storage unit 130 stores therein various kinds of information referenced and generated by the information processing device 100. For example, the storage unit 130 stores therein result information 131, facility order information 132, facility order priority information 133, facility order rule information 134, and grouping information 135. The storage unit 130 may include a main storage unit and an auxiliary storage unit. Examples of the main storage unit include semiconductor memories such as an SRAM and a DRAM. Examples of the auxiliary storage unit include a hard disk device and an SSD (Solid State Drive).

The result information 131 indicates a processing start time point and a processing end time point for each facility used to manufacture a product. The facility order information 132 indicates the order of facilities (hereinafter sometimes referred to as "facility order") used to manufacture a product. The facility order priority information 133 indicates the priority of the order of facilities used to manufacture a product. The facility order rule information 134 indicates a sequential relation of facilities extracted from the order of facilities used to manufacture a product. The grouping information 135 indicates a group of facility orders in which sequential relations of facilities used during the manufacturing of the products match each other.

The arithmetic unit 140 is hardware for controlling the operation of the entire information processing device 100. The arithmetic unit 140 may be a processor such as a CPU (Central Processing Unit) and a GPU (Graphics Processing Unit). The arithmetic unit 140 may be a single core processor or a multi-core processor. The arithmetic unit 140 may include a hardware circuit (for example, FPGA (Field-Programmable Gate Array) or ASIC (Application Specific Integrated Circuit)) for performing a part or whole of processing.

The arithmetic unit 140 includes a facility order extraction unit 200, repetitive facility order processing unit 300, a priority determination unit 400, a grouping unit 500, and a grouping output unit 600. The facility order extraction unit 200, the repetitive facility order processing unit 300, the priority determination unit 400, the grouping unit 500, and the grouping output unit 600 can be implemented when a processor reads a program for implementing the functions of the units and executing the program after loading the program onto a DRAM (Dynamic Random Access Memory).

The facility order extraction unit 200 extracts, from the result information 131, facilities used for processing during the manufacturing of products with the same serial number in chronological order.

In the case where facilities through which a product passes are repetitive due to rework (reprocessing), the repetitive facility order processing unit 300 executes data preprocessing for removing the repetitive second and subsequent facilities from the facility order information 132.

The priority determination unit 400 uses the facility order information 132 to provide a priority in a facility order and stores the priority in the facility order priority information 133.

The grouping unit 500 uses the facility order priority information 133 and the facility order rule information 134 to determine a group to which facility orders belong, and stores the group in the grouping information 135. In this case, the grouping unit 500 performs grouping of facility orders in which sequential relations of facilities extracted from the facility orders match each other into the same group, and performs grouping of facility orders in which sequential relations of facilities extracted from the facility orders do not match each other into different groups. For example, the grouping unit 500 performs grouping of facility orders that do not include sequential relations of facilities in a reverse direction among facility orders into the same group, and performs grouping of facility orders that include sequential relations of facilities in a reverse direction among facility orders into different groups. The grouping unit 500 can integrate the facility orders grouped into the same group, and set the integrated facility order as a display facility order of the group.

The grouping output unit 600 transmits grouping results calculated by the grouping unit 500 to the display device 3 in FIG. 1.

The communication unit 150 transmits and receives information to and from the external device. For example, the communication unit 150 receives the production line result data 2 from the computer system 1. The communication unit 150 transmits visualized information on production result data based on grouping results calculated by the information processing device 100 to the display device 3.

Figure 3:
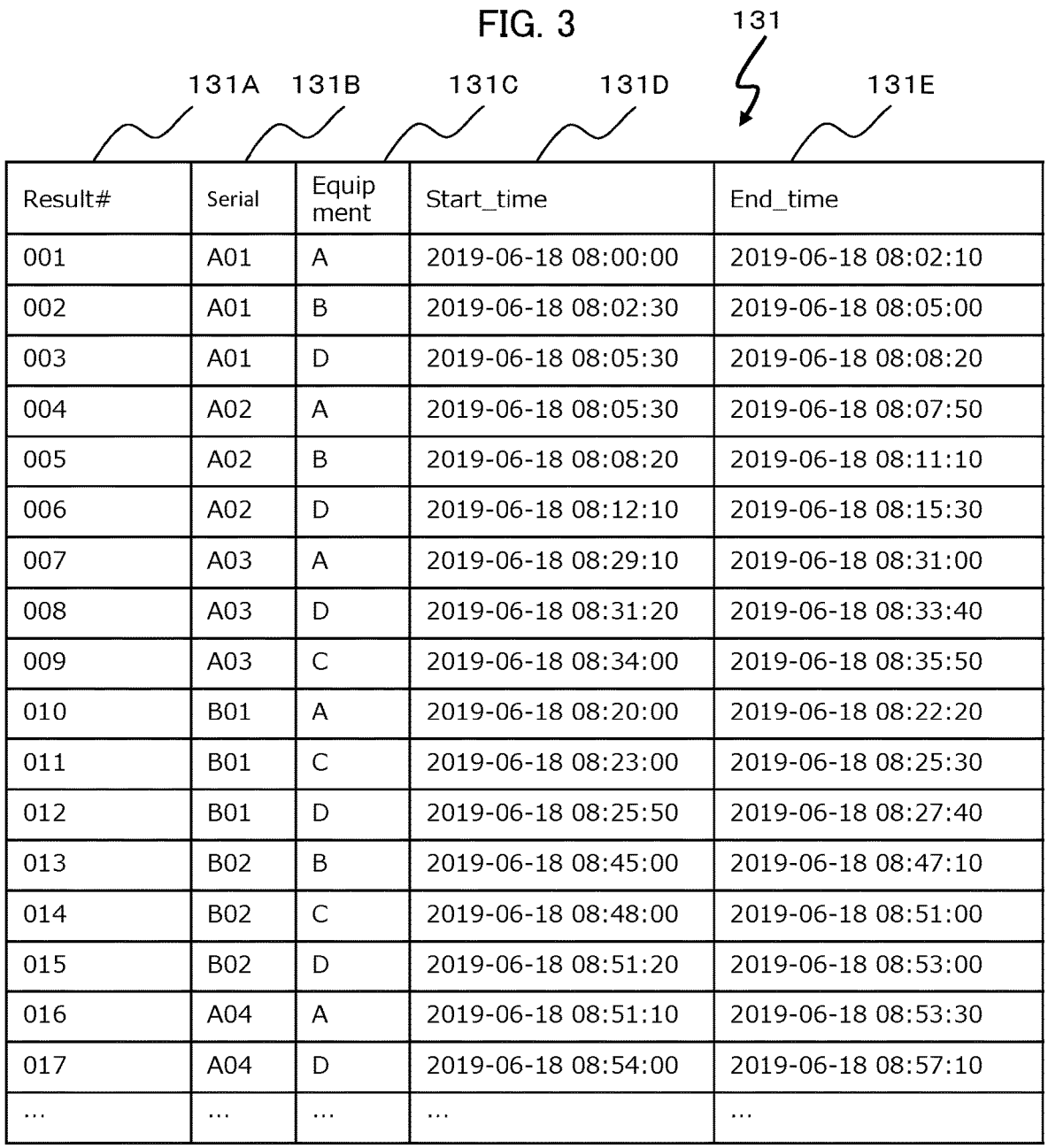
FIG. 3 is a diagram illustrating an example of result information in FIG. 2.

FIG. 3 is a diagram illustrating an example of result information in FIG. 2. In FIG. 3, the result information 131 is information extracted from the production line result data 2. The result information 131 has records in which pieces of information result #131A, Serial 131B, Equipment 131C, start_time 131D, End_time 131E are associated.

Result #131A is a number allocated to each result data. Serial 131B is an identification number of each product. Equipment 131C is an identification number of each facility in a production line. Start_time 131D indicates a time point at which a product is input to a particular facility and processing is started. End_time 131E indicates a time point at which a product is processed by a particular facility and processing is finished.

For example, the record of the result #131A "001" indicates that the processing of the product with the Serial "A01" is started in the facility A at the time point "2019-06-18 08:00:00" and the processing is finished in the facility A at the time point "2019-06-18 08:02:10".

Note that the Start_time 131D and the End_time 131E may be acquired from a log of a production facility, may be manually input from an information input terminal, and may be determined from fluctuation in sensor measurement value.

Figure 4:
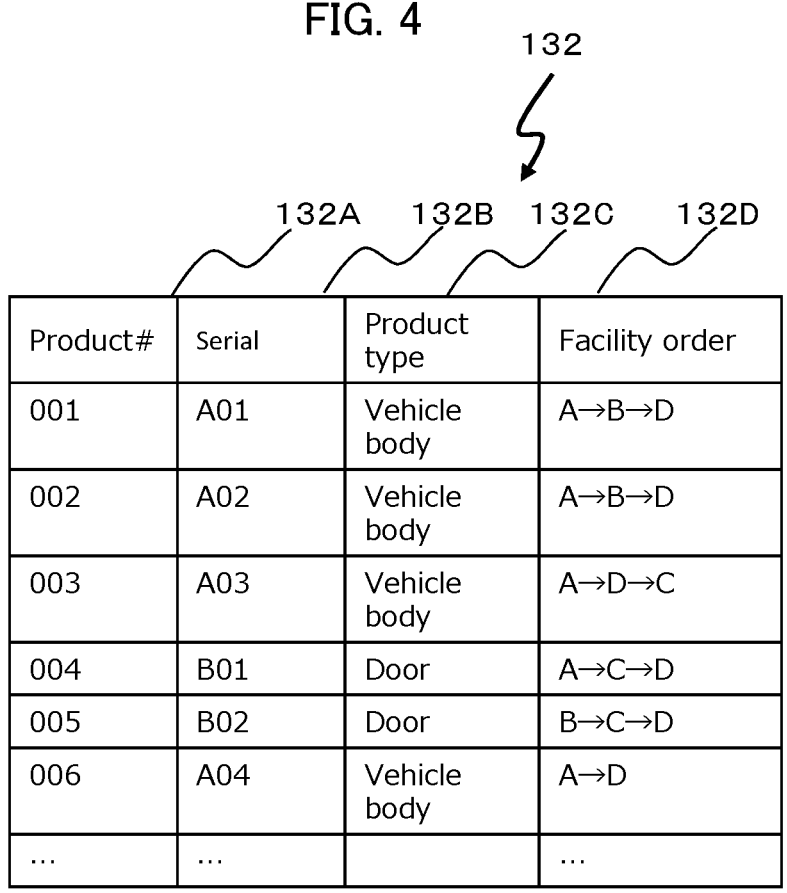
FIG. 4 is a diagram illustrating an example of facility order information extracted from the result information in FIG. 2.

FIG. 4 is a diagram illustrating an example of facility order information extracted from the result information in FIG. 2.

In FIG. 4, facility order information 132 has a record in which pieces of information such as a product #132A, a Serial 132B, a product type 132C, and a facility order 132D are associated with one another.

The product #132A is a number provided to each record of the facility order information 132. The Serial 132B is an identification number of each product. The product type 132C is a product type to which each product belongs. The facility order 132D is the order of facilities through which each product has passed.

For example, the record of the product #132A "001" indicates that the product type of the product with the Serial 132B "A01" is a vehicle body and the product has been produced in the order of the facility A, the facility B, and the facility D.

By using the order of facilities through which each product has actually passed as the facility order, production conditions such as rework caused by facility failure or processing defects can be reflected to the facility order.

Note that the product type 132C may be stored in the result information 131, or may be acquired from master data indicating the relation between the product type and the product. The facility order information 132 may be generated from master data indicating the relation between the product and the facility order.

Figure 5:
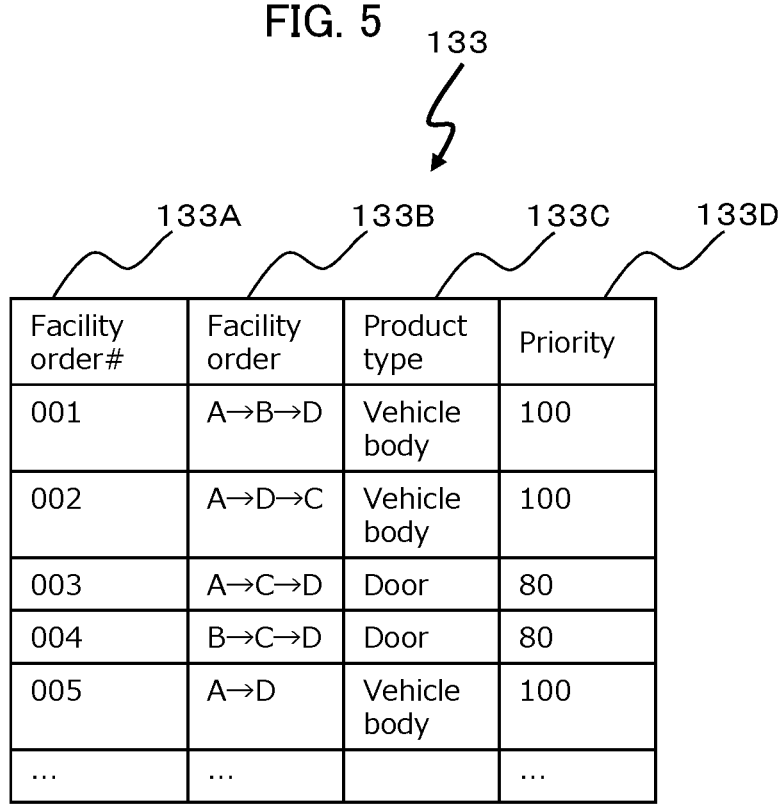
FIG. 5 is a diagram illustrating an example of facility order priority information on facility orders in FIG. 4.

FIG. 5 is a diagram illustrating an example of facility order priority information corresponding to the facility order in FIG. 4.

In FIG. 5, facility order priority information 133 has a record in which pieces of information such as a facility order #133A, a facility order 133B, a product type 133C, and a priority 133D are associated with one another.

The facility order #133A is a number provided to each record of the facility order priority information 133. The facility order 133B indicates a facility order. The product type 133C is the product type of a product. The priority 133D is the priority of a facility order.

For example, the record of the facility order #133A "001" indicates that the priority of the product type "vehicle body" produced in the order of the facility A, the facility B, and the facility D is 100.

Figure 6:
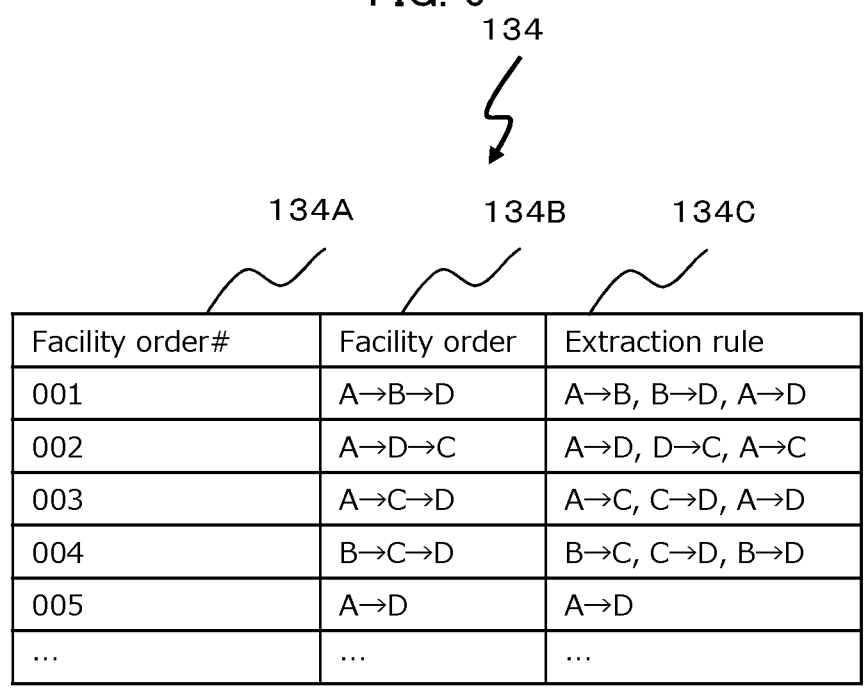
FIG. 6 is a diagram illustrating an example of facility order rule information extracted from the facility order information in FIG. 4.

FIG. 6 is a diagram illustrating an example of facility order rule information extracted from the facility order information in FIG. 4.

In FIG. 6, facility order rule information 134 has a record in which pieces of information such as a facility order #134A, a facility order 134B, and an extraction rule 134C are associated with one another.

The facility order #134A is the same information as the facility order #133A in FIG. 5. The facility order 134B is the same information as the facility order 133B in FIG. 5. The extraction rule 134C is a rule indicating a sequential relation of facilities extracted by using the facility order 134B. The sequential relation of facilities can be indicated by a pair of a previous facility and a subsequent facility.

For example, the facility order 134B in the record with the facility order #134A "001" is "A→B→D". The facility order 134B of "A→B→D" includes a sequential relation that "facility A is before facility B", a sequential relation that "facility B is before facility D", and a sequential relation that "facility A is before facility D". Thus, the extraction rule 134C in the record with the facility order #134A "001"

indicates that the sequential relations of facilities extracted from the facility order of "A→B→D" are "A→B, B→D, A→D".

Figure 7:
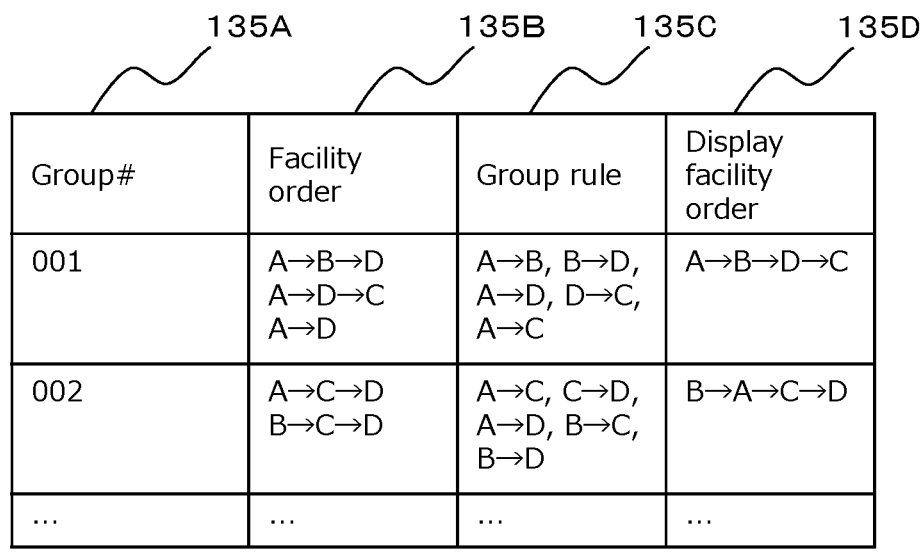
FIG. 7 is a diagram illustrating an example of grouping information generated on the basis of the facility order rule information in FIG. 6.

FIG. 7 is a diagram illustrating an example of grouping information generated on the basis of the facility order rule information in FIG. 6.

In FIG. 7, grouping information 135 has a record in which pieces of information such as a group #135A, a facility order 135B, a group rule 135C, and a display facility order 135D are associated with one another.

The group #135A is a number provided to each record of the grouping information 135. The facility order 135B is a list of facility orders grouped in the same group. The group rule 135C is a rule indicating sequential relations of the facility order in the group #135A. The display facility order 135D is a facility order on the vertical axis when the products belonging to the group #135A are displayed on the chart. The display facility order 135D can be generated by integrating the facility orders 135B belonging to the same group.

For example, the record of which group #135A is "001" indicates that three facility orders of "A→B→D", "A→D→C", and "A→D" belong to the same group, the group rule is "A→B, B→D, A→D, D→C, A→C", and the display facility order is "A→B→D→C".

Figure 8:
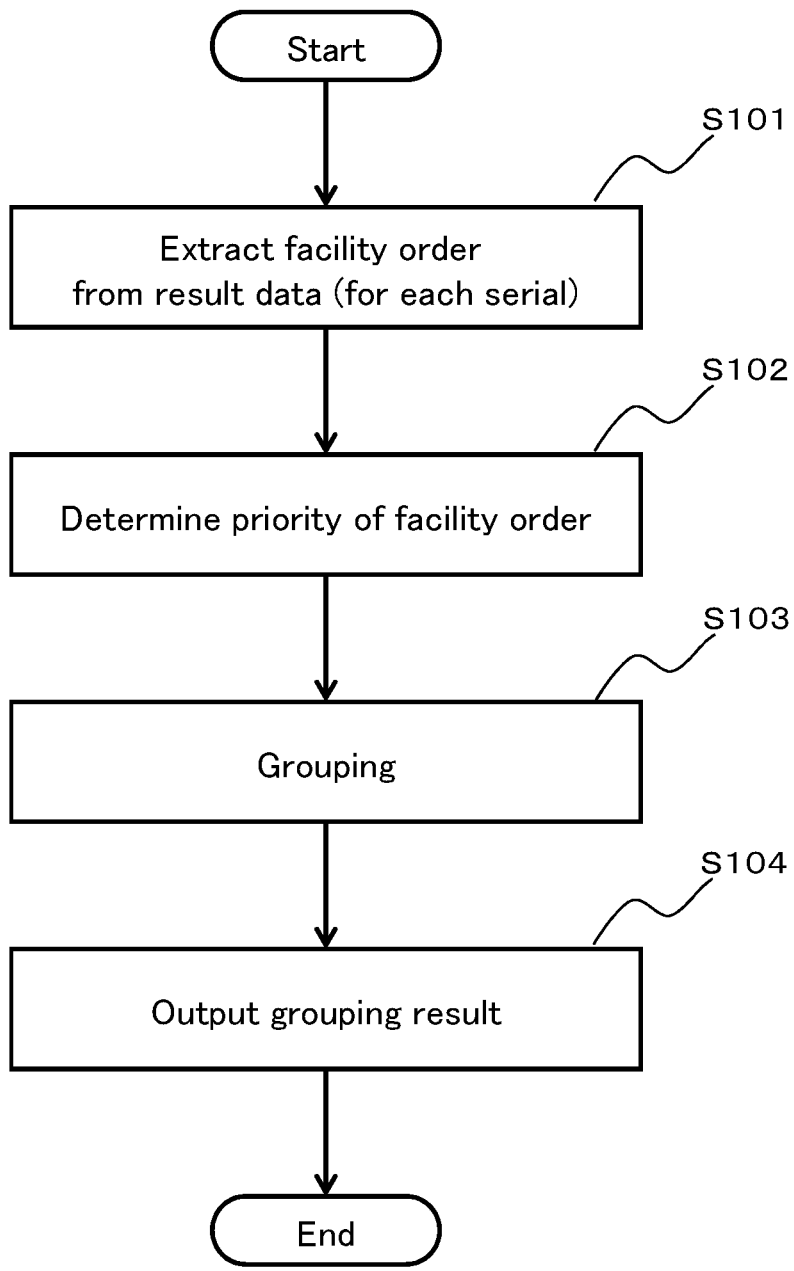
FIG. 8 is a flowchart illustrating an example of processing by the information processing device in FIG. 1.

FIG. 8 is a flowchart illustrating an example of the processing by the information processing device in FIG. 1.

The information processing device 100 in FIG. 2, upon receiving an instruction to execute processing from a user through the input unit 110, executes the processing in FIG. 8.

In this case, in Step S101, the facility order extraction unit 200 in FIG. 2 extracts a facility order from the result information 131 in FIG. 3, and stores the extracted facility order in the facility order information 132 in FIG. 4. Regarding the records of "001", "002", "003" in the result #131A in the result information 131, for example, the facility order extraction unit 200 extracts the fact that the product of which Serial 131B is "A01" has been processed in the order of the facility A, the facility B, and the facility D on the basis of the time point order of the Start_time 131D and the End_time 131E and the Equipment 131C, and stores a facility order of "A→B→D" in the facility order 132D in the record of which product #132A is "001" in the facility order information 132.

Next, in Step S102, the priority determination unit 400 provides a priority to the facility order extracted in Step S101. Regarding the records of "001", "002", "005" in the facility order #133A in the facility order priority information 133, for example, the priority determination unit 400 provides a priority "100" because the product type is similarly "vehicle body", and registers the priority "100" in the facility order priority information 133 in FIG. 5.

Priorities of facility orders #133A having close priorities may be freely designated in consideration that the facility orders are highly possibly displayed in the same chart. For example, in the case of displaying many products on a single chart, the priority determination unit 400 may calculate the number of products in the facility order #133A from the result information 131, and provide higher priorities in descending order of the number of products. The method for providing priorities is not limited to the exemplified method.

Next, in Step S103, the grouping unit 500 uses the facility order priority information 133 to generate the facility order rule information 134 in FIG. 6, and uses the facility order rule information 134 to perform grouping processing, thereby generating the grouping information 135 in FIG. 7.

Next, in Step S104, the grouping output unit 600 uses the grouping information 135 calculated in Step S103 to output grouping results, and displays the grouping results on the display device 3 in FIG. 1.

Figure 9:
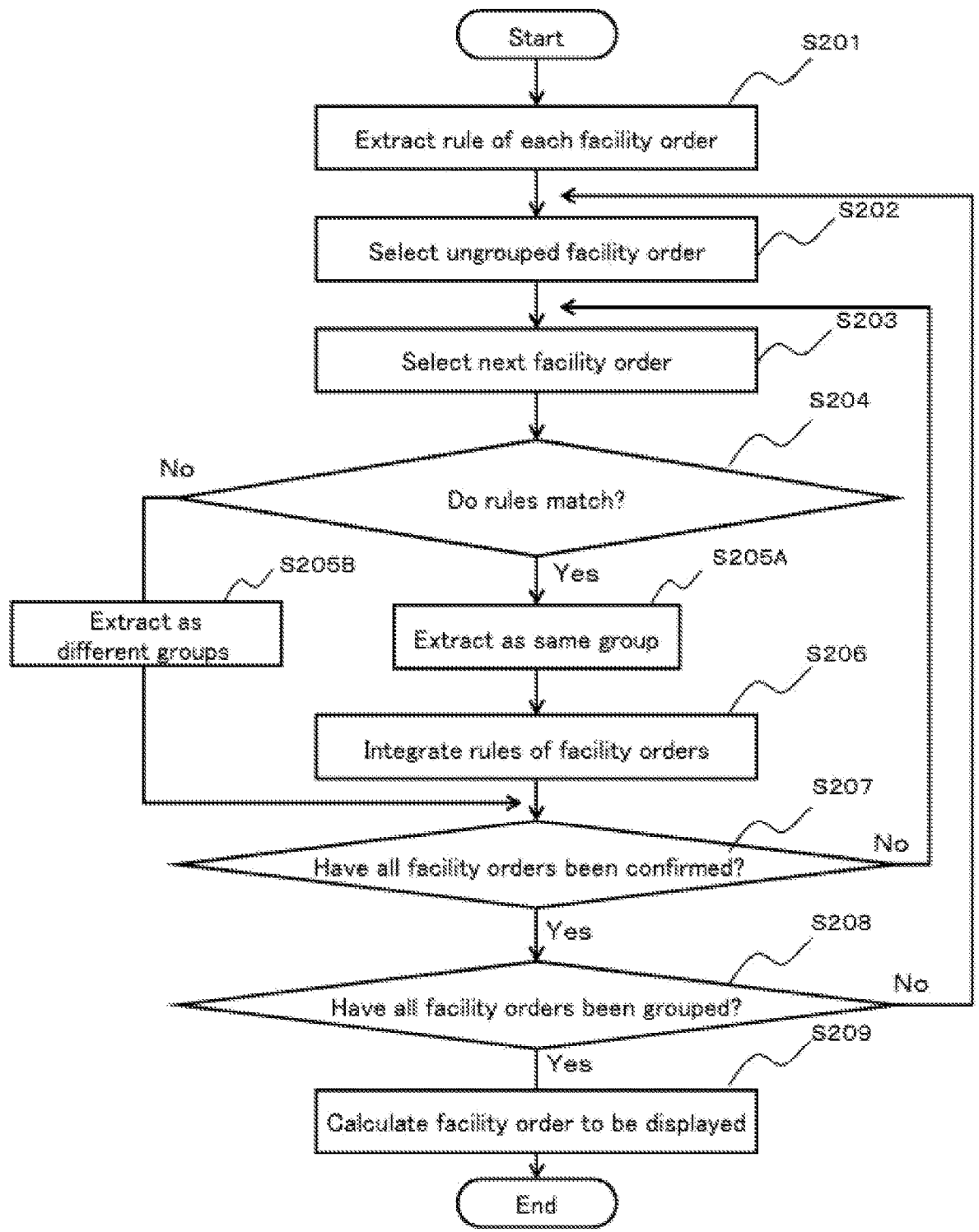
FIG. 9 is a flowchart illustrating an example of grouping processing in FIG. 8.

FIG. 9 is a flowchart illustrating an example of the grouping processing in FIG. 8. In FIG. 9, in Step S201, the grouping unit 500 in FIG. 2 uses the facility order priority information 133 in FIG. 5 to extract a rule indicating a sequential relation of facilities, and stores the extracted rule in the facility order rule information 134 in FIG. 6.

For example, it is understood that the facility order of the facility order #133A "001" in the facility order priority information 133 is "A→B→D", and "facility A is before facility B, facility B is before facility D, and facility A is before facility D". Thus, the rule indicating the sequential relation of the facilities is set as "A→B, B→D, A→D", and stored in the extraction rule 134C in the facility order #134A "001" in the facility order rule information 134.

Next, in Step S202, the grouping unit 500 uses the facility order priority information 133 to select a facility order #133A having the height highest priority from among facility orders #133A that have not been grouped yet. For example, the grouping unit 500 selects a facility order #133A "001" of which priority 133D is "100".

Next, in Step S203, the grouping unit 500 uses the facility order priority information 133 to select the next facility order #133A having the highest priority from among facility orders #133A that have not been grouped yet. For example, the grouping unit 500 selects a facility order #133A "002" of which priority 133D is "100".

Next, in Step S204, the grouping unit 500 uses the facility order rule information 134 to determine whether rules indicating sequential relations of facilities of the facility order #133A selected in Step S202 and the facility order #133A selected in Step S203 match each other.

For example, an extraction rule 134C of the facility order #133A "001" is "A→B, B→D, A→D", and an extraction rule 134C of the facility order #133A "002" is "A→D, D→C, A→C". The extraction rule "A→B, B→D, A→D" does not include a sequential relation of facilities in a direction reverse to the extraction rule of "A→D, D→C, A→C", and hence it can be determined that the sequential relations of the facilities match each other. When the sequential relations of the facilities match each other ("Yes" in Step S204), the flow proceeds to next Step S205A.

Next, in Step S205A, the grouping unit 500 performs grouping of the facility orders #133A in which sequential relations of facilities extracted from the facility orders have been determined to match each other into the same group, and stores the group in the facility order 135B in the grouping information 135.

For example, the grouping unit 500 stores "A→B→D", which is the facility order #133A "001", and "A→D→C", which is the facility order #133A "002", in the facility order 135B for the group #135A "001" in the grouping information 135 in FIG. 7.

Next, in Step S206, the grouping unit 500 stores the extraction rules 134C of the facility orders #133A for which the sequential relations of facilities have been determined to match each other in Step S205 in the group rule 135C in the grouping information 135 in FIG. 7, and the flow proceeds to Step S207.

For example, when the grouping unit 500 determines that the sequential relations of facilities in the facility order #133A "001" and the facility order #133A "002" match each other, the grouping unit 500 integrates the extraction rule 134C of "A→B, B→D, A→D" and the extraction rule 134C of "A→D, D→C, A→C", and stores the integrated extraction rule in the group rule 135C as "A→B, B→D, A→D, D→C, A→C".

On the other hand, when the sequential relations of the facilities do not match each other ("No" in Step S204), the flow proceeds to Step S205B. For example, when "002" and "003" of the facility order #133A are compared, the extraction rule for the facility order 133A "002" is "A→D, D→C, A→C" and the extraction rule for the facility order 133A "003" is "A→C, C→D, A→D". "D→C" included in the extraction rule for the facility order 133A "002" and "C→D" included in the extraction rule for the facility order 133A "003" have sequential relations in opposite directions. Thus, it can be determined that the extraction rule "A→D, D→C, A→C" includes sequential relations of facilities, such as "A→C, C→D, A→D" and "A→D, D→C, A→C", that are in a direction reverse to the extraction rule, and the sequential relations of facilities do not match each other.

Next, in Step S205B, the grouping unit 500 performs grouping of facility orders #133A in which sequential relations of facilities extracted from the facility orders have been determined not to match each other into different groups, and stores the groups in the facility order 135B in the grouping information 135.

For example, the grouping unit 500 stores "A→D→C" of which facility order #133A is "002" in the facility order 135B of which group #135A is "001" in the grouping information 135, and stores "A→C→D" of which facility order #133A is "003" in the facility order 135B of which group #135A is "002" in the grouping information 135.

Note that, when no group has been registered in the grouping information 135, the grouping unit 500 compares the extraction rules 134C in FIG. 6 to determine whether the facility orders 134B designated by the facility orders #134A are grouped in the same group. When a group has been registered in the grouping information 135, the grouping unit 500 compares the extraction rule 134C in FIG. 6 with the group rule 135C in FIG. 7 to determine whether the facility orders 134B designated by the facility orders #134A are grouped in the same group.

For example, after "A→B→D" of which facility order #133A is "001" and "A→D→C" of which facility order #133A is "002" are stored in the facility order 135B of which group #135A is "001" in the grouping information 135, the facility order #133A "005" of which priority 133D is "100" is selected as the next facility order in S203.

In this case, the grouping unit 500 compares the extraction rule 134C for the facility order #133A "005" and the group rule 135C for the group #135A "001". When the grouping unit 500 determines that the rules indicating the sequential relations of the facilities match each other, the grouping unit 500 adds "A→D", which is the facility order #133A "005", to the facility order 135B in the group #135A "001".

Next, in Step S207, the grouping unit 500 determines whether all facility orders #133A that have not been grouped have been selected. When the grouping unit 500 determines that all facility orders #133A have been selected ("Yes" in Step S207), the flow proceeds to Step S208. On the other hand, when the grouping unit 500 determines that all facility orders #133A have not been selected ("No" in Step S207), the flow proceeds to Step S203.

Next, in Step S208, the grouping unit 500 determines whether all facility orders #133A have been grouped. When there is a facility order #133A that has not been grouped yet ("No" in S208), the flow proceeds to Step S202. On the other hand, when all facility orders have already been grouped ("No" in Step S208), the grouping unit 500 proceeds to Step S209.

Next, in Step S209, the grouping unit 500 uses the group rule 135C to calculate the facility order on the vertical axis when all products belonging to the same group are displayed on the same chart, and store the calculated facility order in the display facility order 135D.

For example, a group rule 135C of the group #135A "001" is "A→B, B→D, A→D, D→C, A→C". The grouping unit 500 calculates a display facility order "A→B→D→C" on the basis of the group rule, and stores the calculated display facility order in the display facility order 135D.

The display facility order 135D may be stored in an order defined in advance or may be freely manually designated. For example, in the case of the group #135A "002", both of the orders "A→B→C→D" and "B→A→C→D" can be displayed, and a method for selecting which of the orders is not limited.

Figure 10:
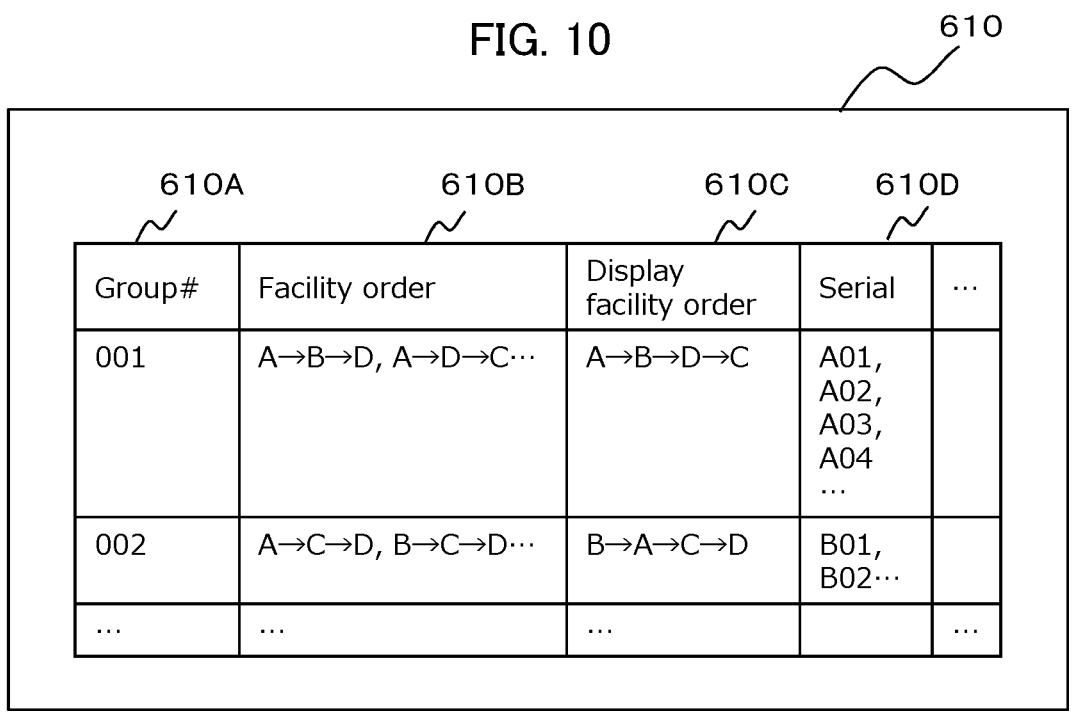
FIG. 10 is a diagram illustrating an example of grouping results in FIG. 8.

FIG. 10 is a diagram illustrating an example of the grouping result in FIG. 8. In FIG. 10, a grouping result 610 has a record in which pieces of information such as a group #610A, a facility order 610B, a display facility order 610C, and a Serial 610D are associated with one another.

The group #610A is a number provided to each record of the grouping result 610. The facility order 610B is a list of facility orders grouped in the same group. The display facility order 610C is a facility order displayed on the vertical axis of a chart to be rendered. The Serial 610D is a result of extracting products that pass through facilities of the facility order 610B by using the facility order information 132 in FIG. 4.

For example, the record of the group #610A "001" indicates that products "A01, A02, A03, A04 . . . " that pass through facilities of the facility order such as "A→B→D" or "A→D→C" can be displayed in one chart of which vertical axis is the facility order "A→B→D→C". Note that information displayed on the basis of the grouping result 610 is not limited to the information in FIG. 10. For example, the production volume may be displayed.

Figure 11:
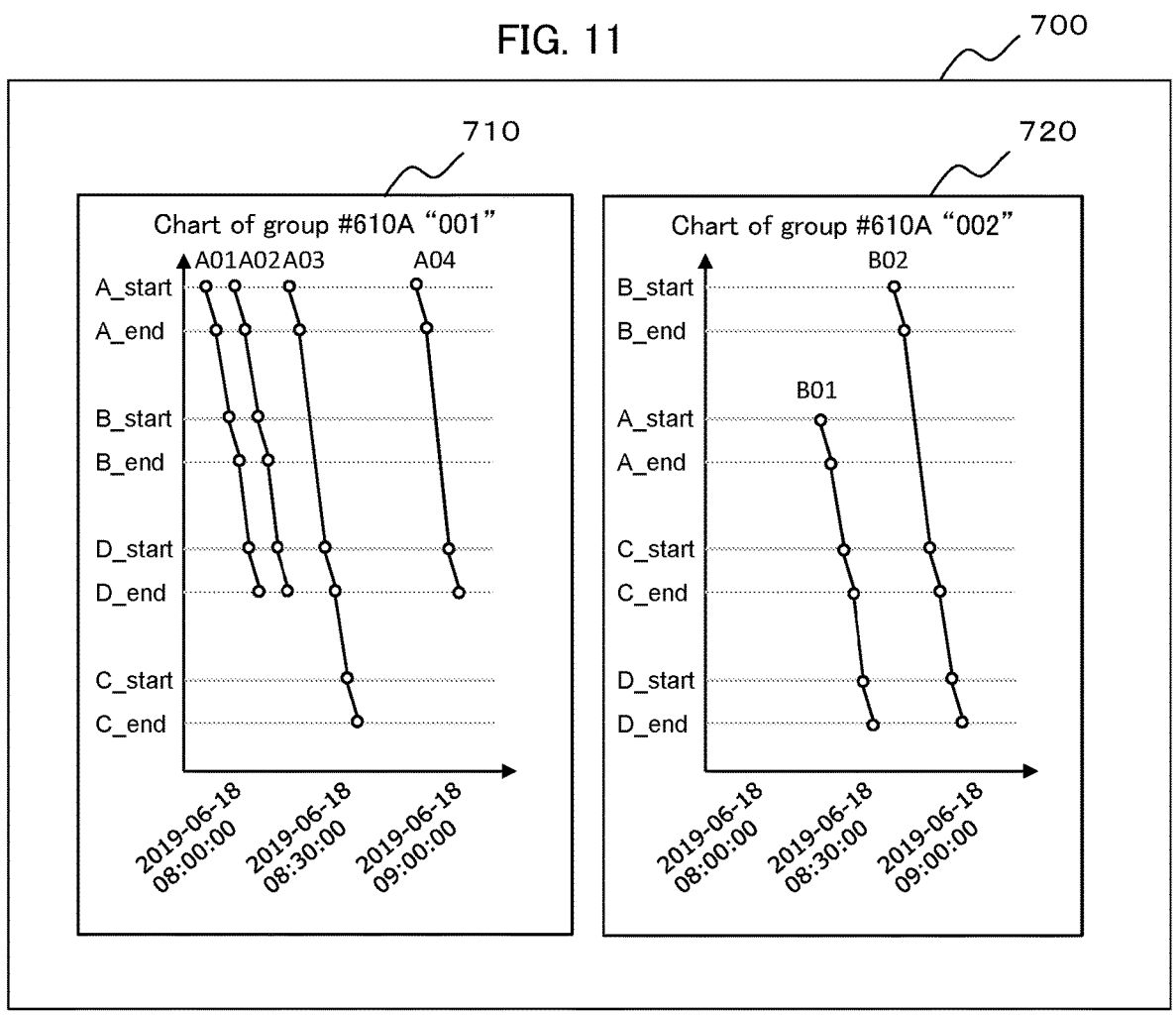
FIG. 11 is a diagram illustrating an example of a visualized screen of production result data based on grouping results in FIG. 10.

FIG. 11 is a diagram illustrating an example of a visualized screen of production result data based on the grouping result in FIG. 10.

In FIG. 11, the display device 3 in FIG. 1 displays a production result data visualized screen 700 in response to the grouping result 610. For example, the production result data visualized screen 700 displays charts 710 and 720. The chart 710 is a chart in which production result data on the group #610A "001" is visualized. The chart 720 is a chart in which production result data on the group #610A "002" is visualized.

Specifically, the chart 710 visualizes the display facility order 610C of which group #610A is "001" for each product specified by the Serial 610D. The vertical axis is, from the top, "A→B→D→C" stored in the display facility order 610C of which group #610A is "001". The horizontal axis is time points. On the chart 710, result information 131 on products stored in the Serial 610D in the group #610A "001" is displayed.

For example, the record of the Serial 131B "A01" is displayed by the leftmost polygonal line in the chart 710. Specifically, the results #"001" to "003" in the result information 131 are displayed in the chart 710, and indicate that the processing start time point in the facility A is "2019-06-18 08:00:00" (not shown), the processing end time point in the facility A is "2019-06-18 08:02:10" (not shown), the processing start time point in the facility B is "2019-06-18

08:02:30" (not shown), the processing end time point in the facility B is "2019-06-18 08:05:00" (not shown), the processing start time point in the facility D is "2019-06-18 08:05:30" (not shown), and the processing end time point in the facility D is "2019-06-18 08:08:20" (not shown).

The chart 720 visualizes the display facility order 610C of which group #610A is "002" for each product specified by the Serial 610D. The vertical axis is, from the top, "B→A→C→D" stored in the display facility order 610C of which group #610A is "002". The horizontal axis is time points. On the chart 720, result information 131 on products stored in the Serial 610D in the group #610A "002" is displayed.

For example, the record of the Serial 131B "B01" is displayed by the leftmost polygonal line in the chart 720. Specifically, the results #"010" to "012" in the result information 131 are displayed in the chart, and "B01" indicates that the processing start time point in the facility A is "2019-06-18 08:20:00" (not shown), the processing end time point in the facility A is "2019-06-18 08:22:20" (not shown), the processing start time point in the facility C is "2019-06-18 08:23:00" (not shown), the processing end time point in the facility C is "2019-06-18 08:25:30" (not shown), the processing start time point in the facility D is "2019-06-18 08:25:50" (not shown), and the processing end time point in the facility D is "2019-06-18 08:27:40" (not shown).

In each of the charts 710 and 720, a polygonal line indicating the facility order during the manufacturing of each product has no peak. Thus, by referring to the charts 710 and 720, it can be confirmed at first sight that there is no problem such as production delay caused by facility failure. The facility orders during the manufacturing of a plurality of products can be displayed on each of the charts 710 and 720, and hence the production conditions of the plurality of products can be efficiently monitored.

Note that the grouping result 610 or the production result data visualized screen 700 may be evaluated, and when the grouping result is undesired grouping, the processing from Step S102 in FIG. 8 may be performed again. For example, in Step S102, by changing the value of the priority 133D, the grouping result of the facility orders can be changed to change the production result data visualized screen 700. The evaluation method may be a method defined in advance, or may be freely manually evaluated. Examples of evaluation criteria include the number of charts, whether products to be displayed together are grouped in the same group, and the number of products that can be displayed on a single chart.

As described above, according to the above-mentioned first embodiment, in high-mix low-volume production type, start time points and end time points of steps for a plurality of products having similar processing step orders (or facility orders) can be displayed on the same chart. In this manner, the production conditions such as the presence/absence of production delay caused by facility failure can be confirmed at first sight, which can support efforts for improving production efficiency and quality. Facility orders are extracted from the production line result data 2 without using master data indicating the relation between the product and the facility order, and hence products processed in a facility order different from master data due to sudden plan change can be appropriately grouped and displayed on a chart.

Note that the method for visualizing grouping results is not limited to the exemplified one. For example, all products may be displayed in a single chart. In this case, the display facility order on the vertical axis may be determined on the basis of the display facility order 135D and the production volume so that the number of peaks of the chart is minimized.

Figure 12:
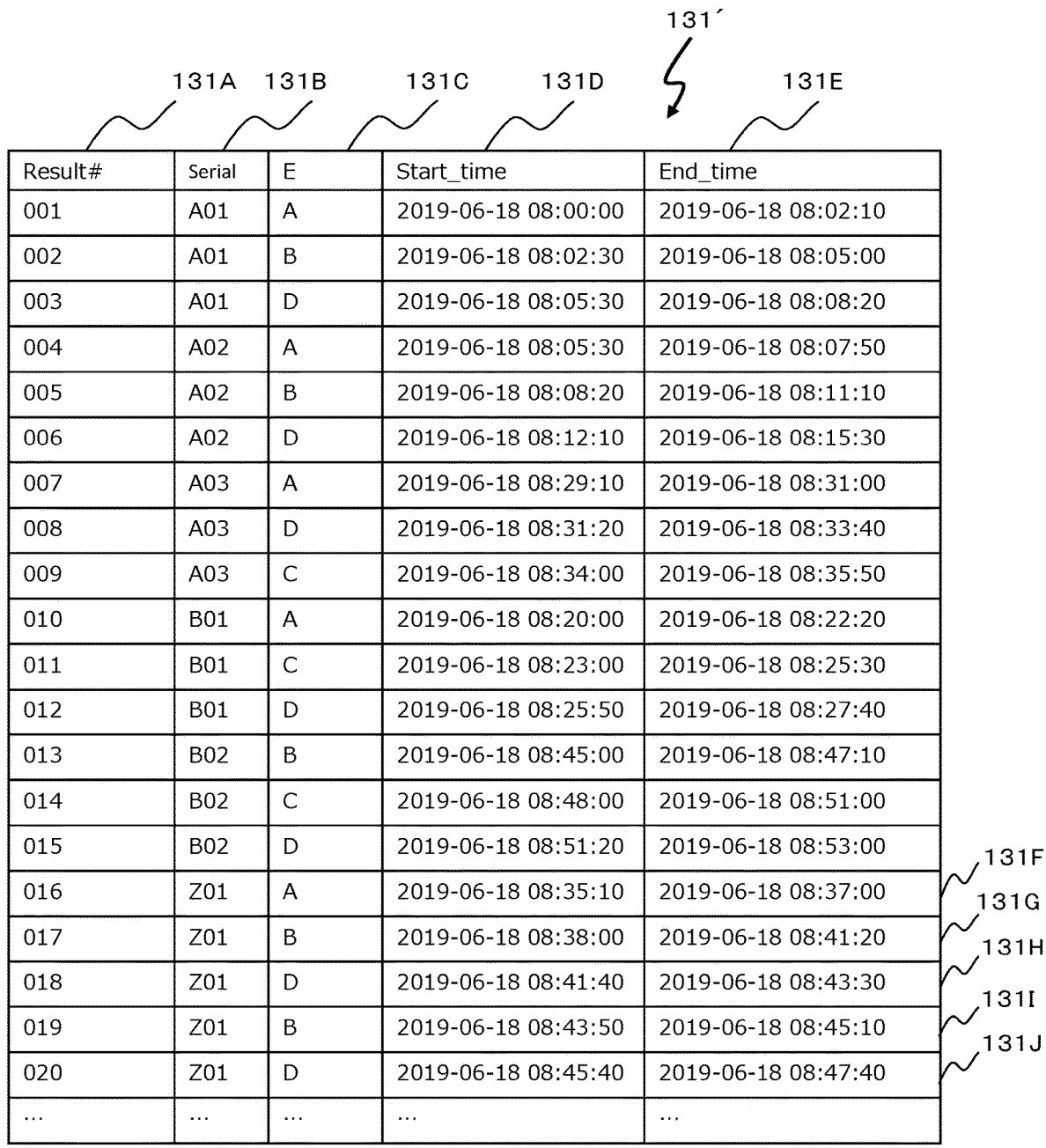
FIG. 12 is a diagram illustrating an example of result information used for an information processing device according to a second embodiment.

FIG. 12 is a diagram illustrating an example of result information used in an information processing device according to a second embodiment.

In result information 131' in FIG. 12, instead of the records for the product of which Serial 131B is "A04" in the result information 131 in FIG. 3, records 131F to 131J for a product of which Serial 131B is "Z01" are added.

The records 131F to 131J indicate that the product with the Serial 131B "Z01" is manufactured by being processed in the order of the facility A, the facility B, the facility D, the facility B, and the facility D. This indicates that the product with the Serial 131B "Z01" has passed through the facilities B and D twice and been reworked.

Figure 13:
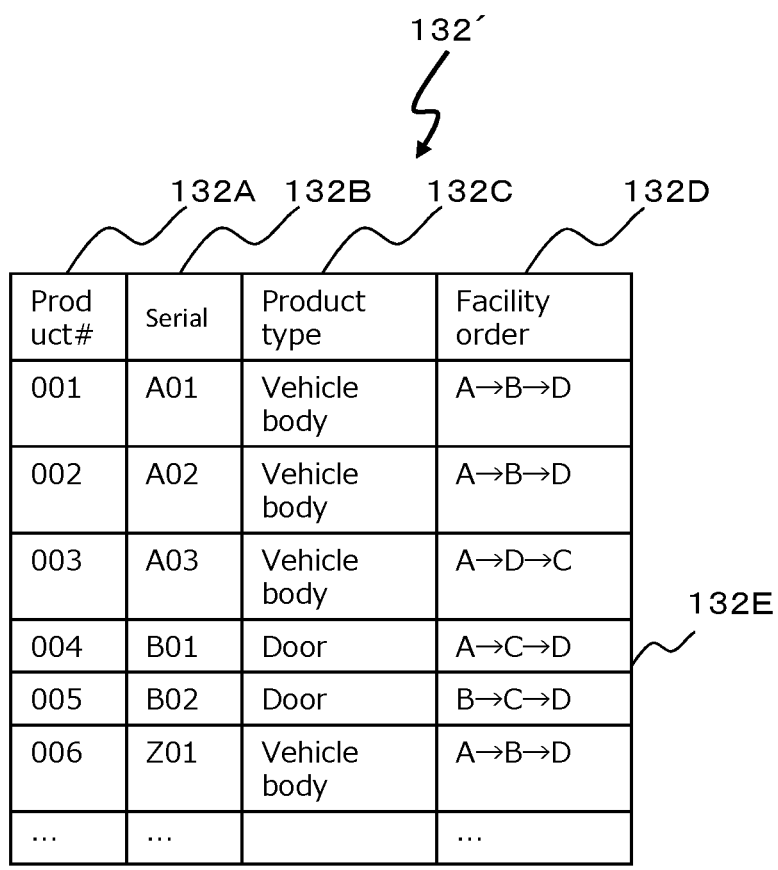
FIG. 13 is a diagram illustrating an example of facility order information extracted from the result information in FIG. 12.

FIG. 13 is a diagram illustrating an example of facility order information extracted from the result information in FIG. 12.

In facility order information 132' in FIG. 13, instead of the records for the product with the Serial 132B "A04" in the facility order information 132 in FIG. 3, a record 132E for a product with the Serial 132B "Z01" is added.

The record 132E indicates that the product type of the product with the Serial 132B "Z01" is a vehicle body and the product is produced in the order of the facility A, the facility B, and the facility D.

Figure 14:
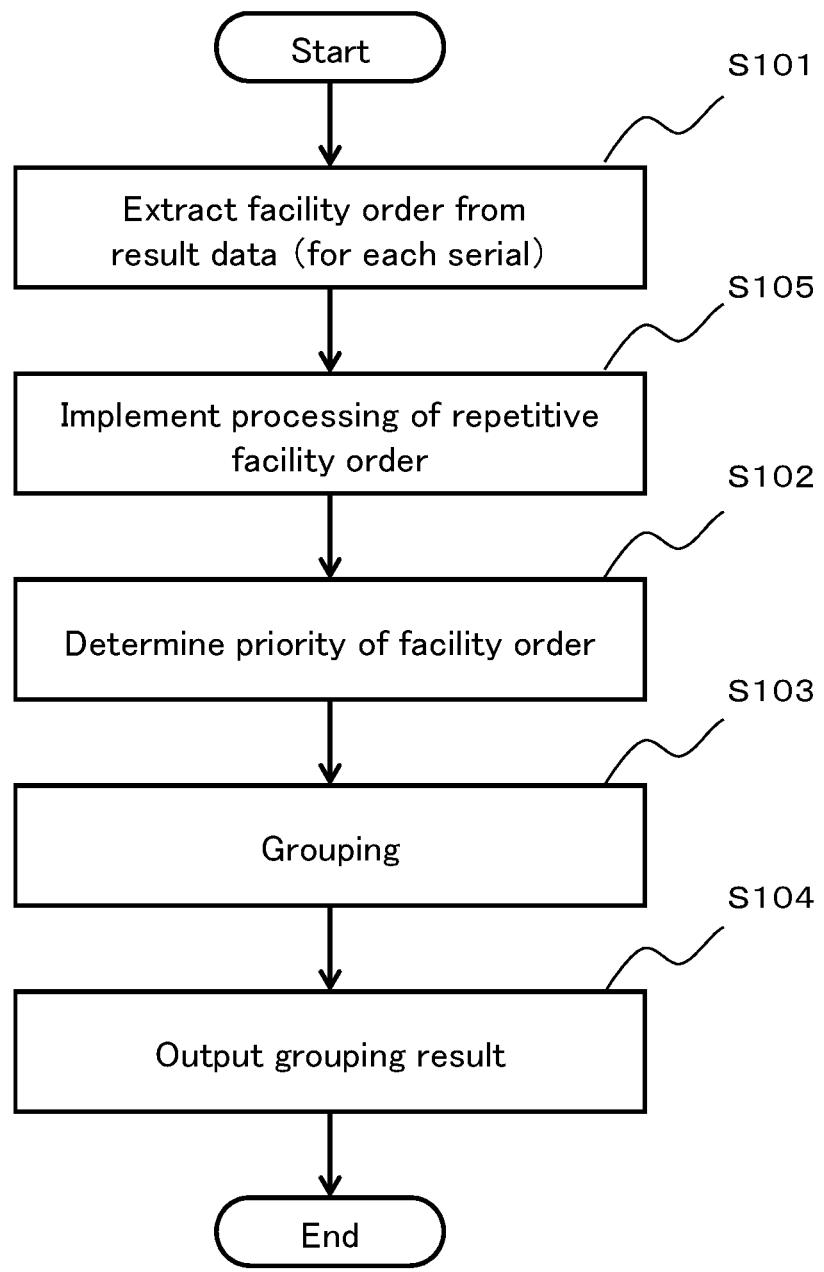
FIG. 14 is a flowchart illustrating an example of the processing by the information processing device according to the second embodiment.

FIG. 14 is a flowchart illustrating an example of processing by the information processing device according to the second embodiment.

In the processing in FIG. 14, Step S105 for processing repetitive facility order is added between Step S101 and Step S102 in FIG. 8.

In Step S105, the repetitive facility order processing unit 300 in FIG. 2 processes the repetitive facility orders extracted from the result information 131 so as to achieve optimal visualization, and stores the processing result in the facility order 132D in FIG. 13.

For example, the repetitive facility order processing unit 300 removes repetitive facility orders as rework. For example, the facility order "A→B→D→B→D" is extracted from the records 131F to 131J in FIG. 12, and in the facility order "A→B→D→B→D", the facility order "B→D" is duplicated. The repetitive facility order processing unit 300 removes the second facility order "B→D" from the facility order "A→B→D→B→D" to obtain a facility order "A→B→D".

The method for processing the repetitive facility orders may be a method defined in advance, and may be freely manually processed. For example, a part of the facility order where rework occurs may be deleted without exception, or normal facility orders and abnormal facility orders may be statistically classified so that a repetitive part of abnormal facility orders may be deleted. Repetitive facility orders are not necessarily required to be deleted as necessary processing by using master data indicating the relation between products and facility orders.

FIG. 15 is a diagram illustrating an example of the grouping result in FIG. 14. In a grouping result 620 in FIG. 15, a record 610E is provided instead of the record of the group #610A "001" in the grouping result 610 in FIG. 10. In the record 610E, "Z01" is registered instead of "A04" in Serial 610D of the group #610A "001".

The record 610E of the group #610A "001" indicates that the products "A01, A02, A03, Z01 . . . " that pass through facilities in the facility order of "A→B→D" or "A→D→C"

can be displayed on a single chart of which vertical axis is the display facility order of "A→B→D→C".

Figure 16:
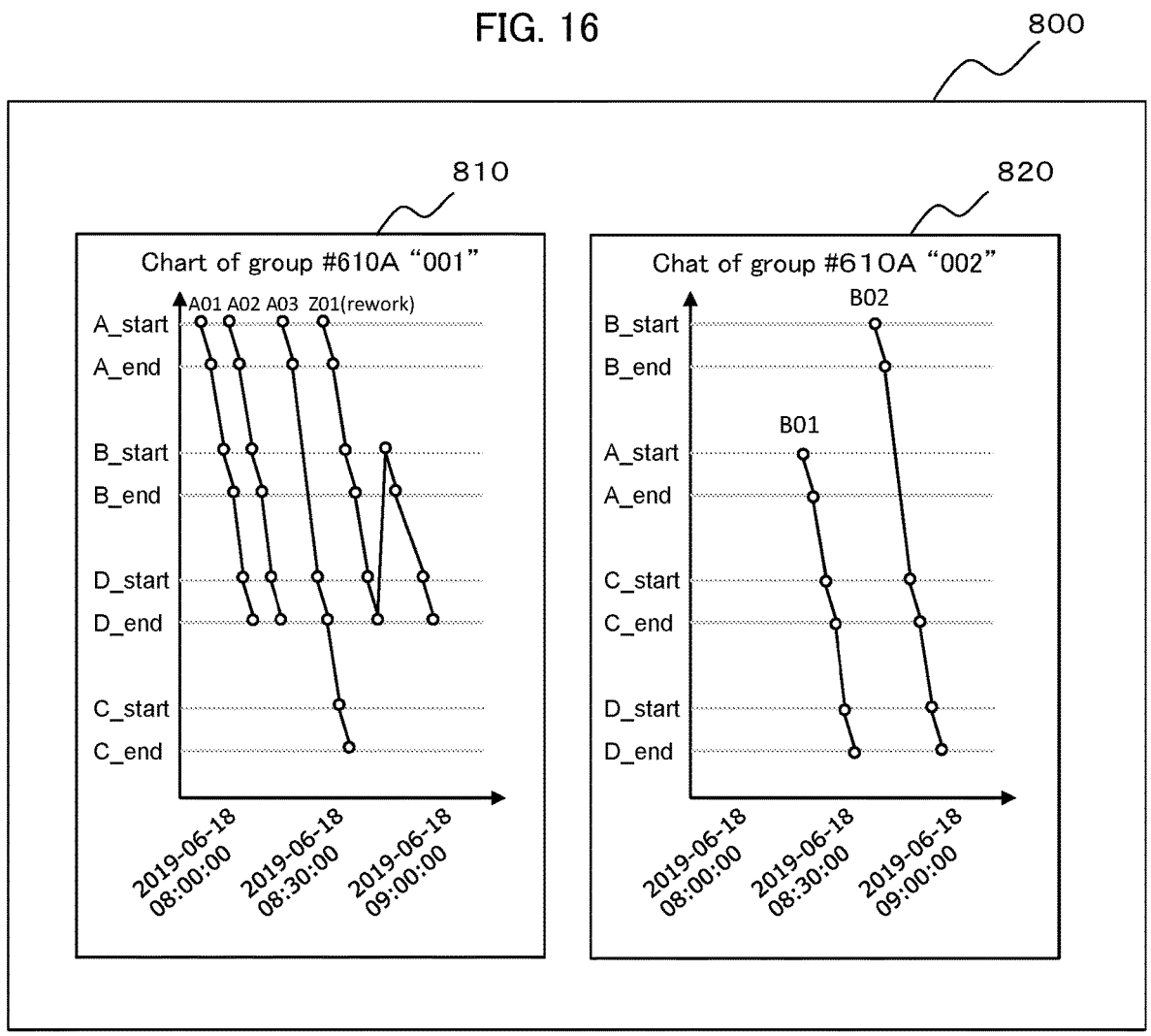
FIG. 16 is a diagram illustrating an example of a visualized screen of production result data based on the grouping results in FIG. 15.

FIG. 16 is a diagram illustrating an example of a visualized screen of production result data based on the grouping result in FIG. 15.

In FIG. 16, the display device 3 in FIG. 1 receives the grouping result 620, and displays the production result data visualized screen 800. For example, the production result data visualized screen 800 displays charts 810 and 820. The chart 820 is similar to the chart 720 in FIG. 11.

In the chart 810, a polygonal line of the product "Z01" is displayed instead of the polygonal line of the product "A04" in the chart 710 in FIG. 11. The polygonal line of the product "Z01" has a peak at a part related to the facility B and the facility D, and rework of the product "Z01" in the facility B and the facility D can be confirmed at first sight.

As described above, according to the above-mentioned second embodiment, a step where rework has occurred can be displayed on the chart as a peak for a product where rework has occurred. In this manner, the production conditions such as rework can be confirmed at first sight, which can support efforts for improving production efficiency and quality.

Figure 17:
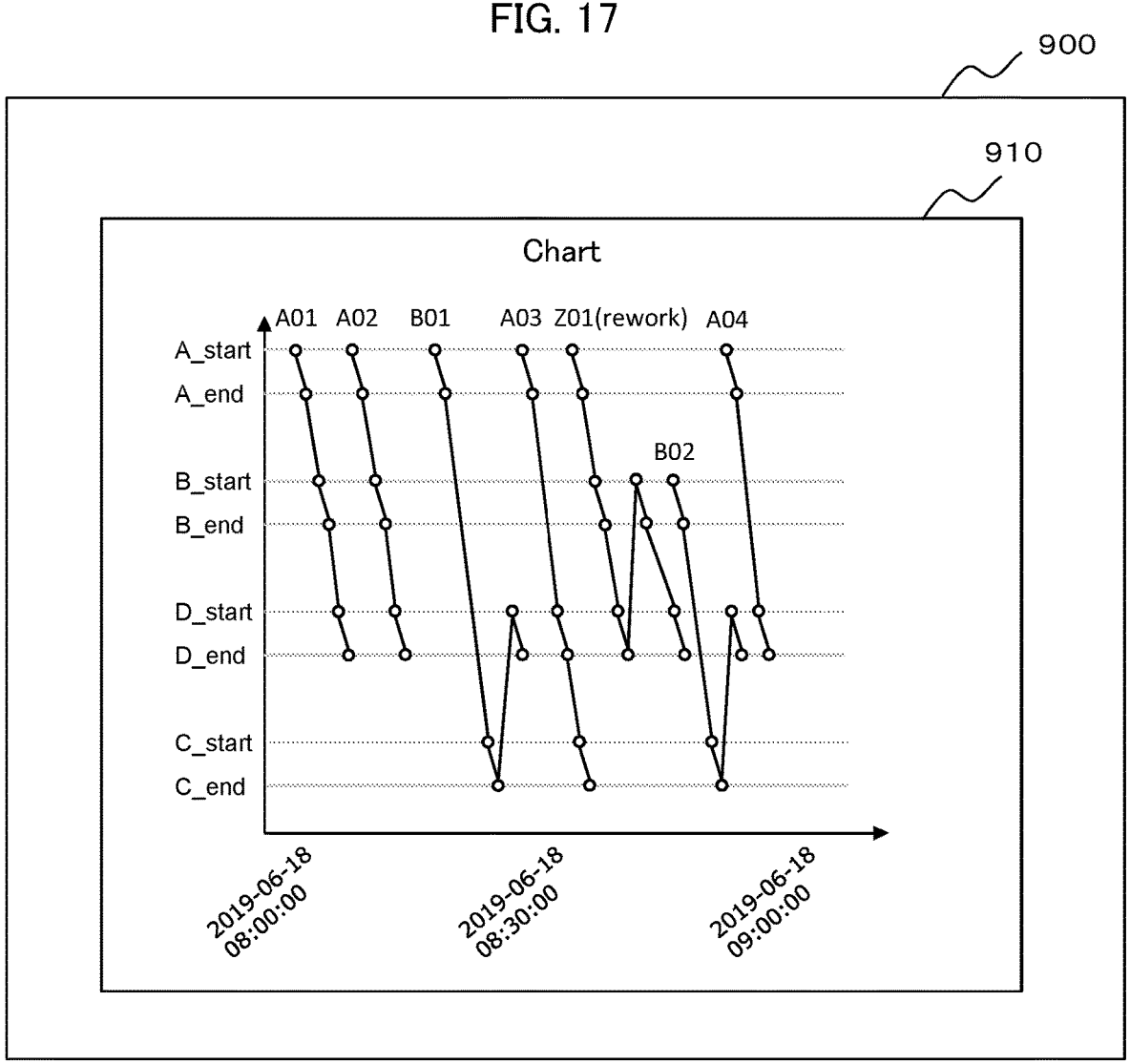
FIG. 17 is a diagram illustrating an example of a visualized screen of production result data in comparison with this embodiment.

FIG. 17 is a diagram illustrating an example of a production result data visualized screen to be compared with this embodiment.

In FIG. 17, for example, a production result data visualized screen 900 displays a chart 910. In the chart 910, polygonal lines of the products "A01" to "A04", "B01", "B02", and "Z01" are displayed with reference to the same vertical axis.

When the vertical axis of the chart 910 is indicated by the same facility order as in the chart 710 in FIG. 11, it indicates that the products "A01" and "A02" are processed in the order of the facility A, the facility B, and the facility D, and it can be confirmed at first sight from the inclination of the polygonal lines of the products "A01" and "A02" that the processing of the products "A01" and "A02" takes the same time and there is no problem such as production delay caused by facility failure.

The chart 910 indicates that the product "Z01" is processed in the order of the facility A, the facility B, the facility D, the facility B, and the facility D, and it can be confirmed at first sight from a peak of the polygonal line connecting the facility B, the facility D, the facility B, and the facility D that rework has occurred due to processing failure in the facility B.

The chart 910, on the other hand, indicates that the product "B01" is processed in the order of the facility A, the facility C, and the facility D and normally processed without rework, but the polygonal line of the product "B01" has a peak, and it seems that rework occurs.

In contrast, in the production result data visualized screen 800 in FIG. 16, the charts 810 and 820 are displayed separately, so that the polygonal lines of the products "A01" to "A03" and "Z01" are displayed in the chart 810, and the polygonal lines of the products "B01" and "B02" are displayed in the chart 820. In the chart 810, the vertical axis is displayed in the same facility order as in the chart 910 in FIG. 17. Thus, by referring to the chart 810, it can be confirmed at first sight that the processing of the products "A01" and "A02" takes the same time and there is no problem such as production delay caused by facility failure, and it can be confirmed at first sight that the product "Z01" has caused rework due to processing defects in the facility B.

In the chart 820, on the other hand, the vertical axis is displayed in the facility order of the facility B, the facility A, the facility C, and the facility D. Thus, in the chart 820, the peaks of the polygonal lines for the products "B01" and "B02" that have occurred in the chart 910 can be removed. As a result, by referring to the chart 820, it can be confirmed at first sight that the products "B01" and "B02" have caused no rework and there is no problem such as production delay caused by facility failure.

Note that the present invention is not limited to the above-mentioned embodiments, and includes various modifications. For example, the above-mentioned embodiments have specifically described for easy understanding of the present invention, and are not necessarily required to be limited to the configuration including all components described above. A part of the configuration in an embodiment can be replaced with the configuration in another embodiment, and the configuration in an embodiment can be added to the configuration in another embodiment. Regarding a part of the configuration in each embodiment, another configuration can be added, deleted, and replaced. A part of whole of the configurations, functions, processing units, and processing means described above may be implemented by hardware by design of an integrated circuit, for example.

What is claimed is:

1. An information processing device comprising:
    a memory storing processing implementation information; and
    a processor, configured to:
        extract, from the stored processing implementation information, on the basis of an order of processing implementations during manufacturing of a product, a sequential relation of the processing implementations during the manufacturing of the product;
        determine, a sequential relation having a highest priority from a plurality of sequential relations that are not yet grouped;
        determine an other sequential relation having a second highest priority from the plurality of sequential relations that not yet grouped; and
        perform grouping of orders of the processing implementations during the manufacturing of the products on the basis of the sequential relation of the processing implementations during the manufacturing of the product, by determining whether rules indicating the sequential relation of the first highest priority and the sequential relation of the second highest priority match,
            on a condition that the rules match, store and integrate the match into a single group, and
            on a condition that the rules do not match, extract the facility orders as different groups; and
        output the grouping results on the display device.

2. The information processing device according to claim 1, wherein the order of the processing implementations during the manufacturing of the product is visualized on the basis of a result of the grouping.

3. The information processing device according to claim 1, wherein orders of processing implementations during manufacturing of a plurality of products grouped in the same group are integrated, and orders of processing implementations of products belonging to the same group are visualized on the basis of the integrated order.

4. The information processing device according to claim 3, wherein, in accordance with the order of the processing implementations during the manufacturing of the product, a start time point and an end time point of the processing are visualized in a time-series manner.

5. The information processing device according to claim 1, wherein orders of processing implementations, which do not include a reverse sequential relation in the order of the processing implementations during the manufacturing of the product, are grouped in the same group.

6. The information processing device according to claim 1, wherein orders of processing implementations, which include a reverse sequential relation in the order of the processing implementations during the manufacturing of the product, are grouped in different groups.

7. The information processing device according to claim 1, wherein orders of processing implementations of the product are grouped while excluding second and subsequent processing implementations that are repeatedly used during the manufacturing of the product.

8. The information processing device according to claim 1, wherein the order of processing implementations during the manufacturing of the product is an order of facilities used for the processing implementation during the manufacturing of the product, an order of steps during the manufacturing of the product, or an order of operations during the manufacturing of the product.

9. The information processing device according to claim 8, wherein the order of facilities used for processing implementation during the manufacturing of the product is an order of facilities through which the product passes during the manufacturing of the product.

10. The information processing device according to claim 1, wherein
a priority is given into the order of processing implementations during the manufacturing of the product on the basis of a type of the product, and
an order of processing implementations during the manufacturing of the product, which is to be grouped, is selected on the basis of the priority.

11. An information processing method executed by a processor, comprising, by the processor:
extracting from stored processing implementation information, on the basis of an order of processing implementations during manufacturing of a product, a sequential relation of the processing implementations during the manufacturing of the product;
determining, a sequential relation having a highest priority from a plurality of sequential relations that are not yet grouped;
determining an other sequential relation having a second highest priority from the plurality of sequential relations that not yet grouped;
performing grouping of orders of processing implementations during the manufacturing of the product on the basis of the sequential relation of the processing implementations during the manufacturing of the product by determining whether rules indicating the sequential relation of the first highest priority and the sequential relation of the second highest priority match,
on a condition that the rules match, storing and integrating the match into a single group, and
on a condition that the rules do not match, extracting the facility orders as different groups; and
outputting the grouping results on the display device.

* * * * *